United States Patent Office 3,332,730
Patented July 25, 1967

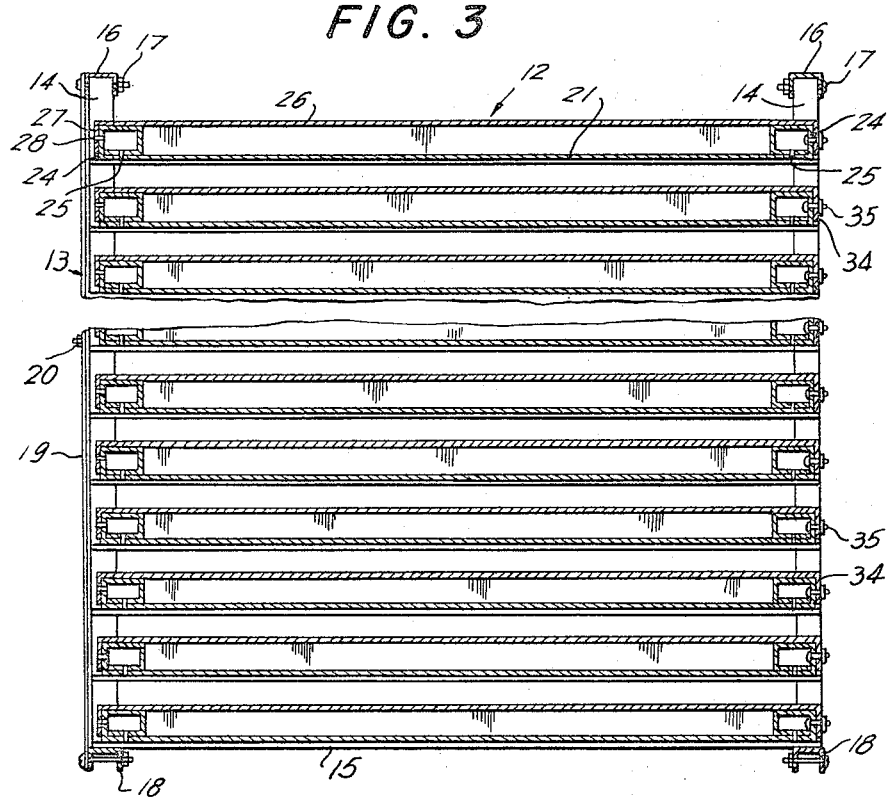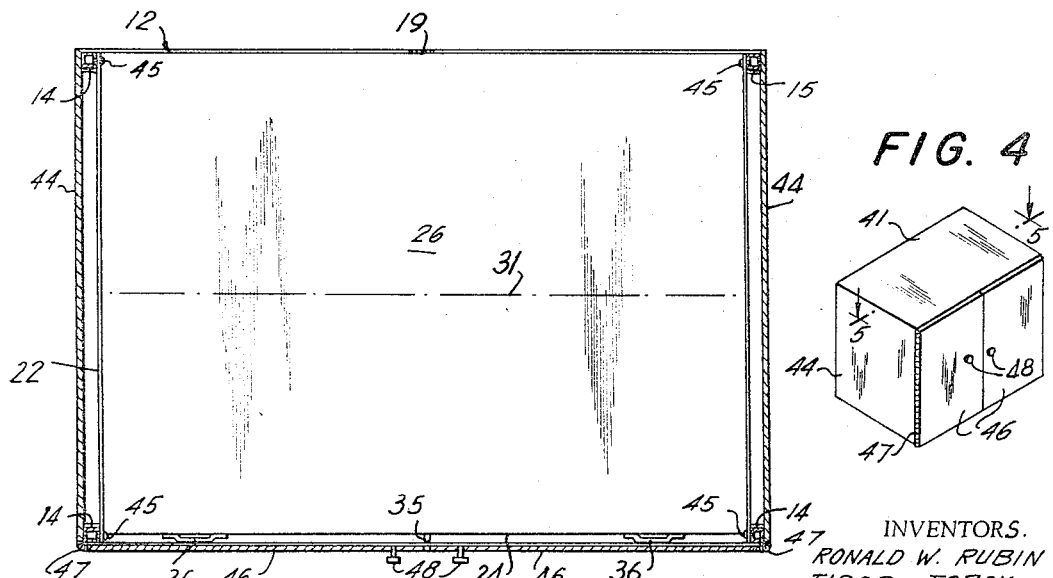

3,332,730
STORAGE UNIT
Ronald W. Rubin, New York, and Tibor Torok, Jamaica Estates, N.Y., assignors to The Valtronic Corporation, New York, N.Y., a corporation of New York
Filed Oct. 24, 1965, Ser. No. 504,678
4 Claims. (Cl. 312—330)

ABSTRACT OF THE DISCLOSURE

A storage system which includes a rigid framework for removably and slidably receiving a plurality of storage drawers in order to maintain the material in the storage drawers readily accessible for current use. The storage drawers are inexpensively fabricated in order that they can be economically removed to a dead storage area when the material therein is no longer on a current basis with additional inexpensive storage drawers replacing those removed from the rigid framework. The storage drawers are preferably fabricated for complete protection of the material stored therein while permitting complete access to the interiors thereof.

---

This invention relates generally to a storage unit and is more specifically directed to a storage unit of the type having a plurality of drawer units of large dimension in the horizontal plane with small vertical dimensions for the flat storage of drawings, graphic art renderings, and the like. The invention is more precisely directed to a transfer type storage system whereby a large number of inexpensive drawer units may be made available for storage of drawings and other papers directed to a particular project in a drawer support unit provided at a work location when the project to which the papers relate is a current work project, with any particular drawer being readily removable for storage at a remote location when not required at a work location such as when work on the particular project has been suspended, delayed or completed.

Storage units for the flat storage of large-sized drawings, prints, graphical displays, etc. are known in the art. Such units have generally been constructed of sheet steel and are considered permanent units in the same manner as other types of permanent metal file cabinets. Such units are generally quite expensive but generally perform the storage function adequately. However, in many fields, especially in graphic arts, drawings, diagrams, renderings, etc. will be required at the work location for a short period of time, such as several weeks. The materials will then be stored in the storage unit and may not be required for a period of several months or longer, or, in fact, may never be required again. In such cases, this material takes up space and fills the file drawers and defeats the purpose of the system which is to keep available material for document retrieval. In this manner, additional file units are constantly required for current use to be maintained in constant readiness and available in the work area.

Accordingly, an object of this invention is to provide a storage unit having inexpensive, individual storage sections which can be used as storage drawers at the work location for ready document availability and which can be removed and stored at remote storage locations when material therein is not immediately required to make available space for storage of new and continuing materials.

Another object of the invention is to provide a storage unit having a permanent framework for sliding support of a plurality of inexpensively fabricated drawer units, the drawer units being removeable and interchangeable, at will.

A further object of the invention is to provide an inexpensive storage unit of the type described which may be selectively equipped to form an attractive storage unit.

Still other objects and advantages of the invention will in part be obvious and will in part be apparent from the specification.

Generally speaking, in accordance with the invention, a storage unit consists of a metal framework having a plurality of receiving channels for the support of inexpensively fabricated storage drawers. The metal unit is of rigid, permanent construction and slideably receives the drawer units for use and storage. The drawer units may be removed for remote storage when the material therein need no longer be immediately available, whereby a new drawer unit may be substituted therefor for receiving new materials for current projects. Metal units may be provided at the remote storage area for receiving the drawer units.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

FIG. 3 is a broken-away sectional view taken along line 3—3 of FIG. 2;

FIG. 4 is a perspective view, at a greatly reduced scale, of a storage unit having finishing panels secured thereto; and FIG. 5 is a sectional view, at enlarged scale, taken along line 5—5 of FIG. 4.

Figure 1:
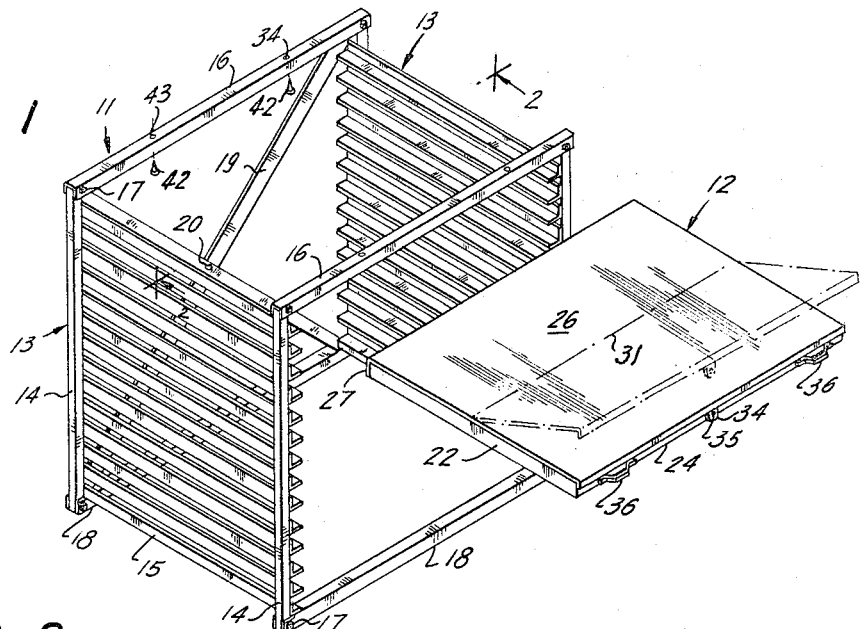
FIG. 1 is a perspective view of the framework of a storage unit constructed in accordance with the invention, with a single drawer section being shown in a removed position.
Figure 2:
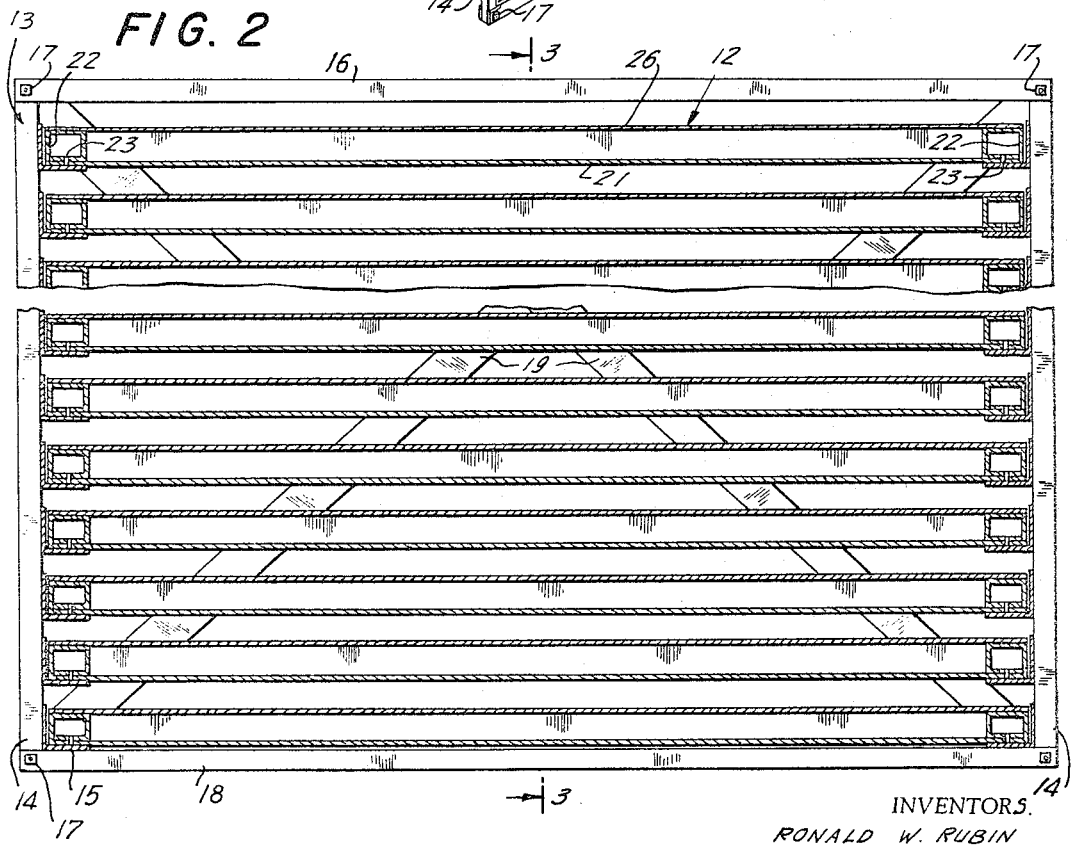
FIG. 2 is a broken-away sectional view taken along line 2—2 of FIG. 1 with a plurality of drawer sections inserted therein.

Referring now to FIGS. 1 through 3, the storage unit consists of a framework 11 and a plurality of drawers 12. Framework 11 is preferably fabricated of steel elements in the manner to be described so that it may be readily knocked down for shipment and storage. Two identical side sections 13 are provided. Each side section includes a pair of spaced vertical tubular sections 14 to which are secured, such as by spot welding, a plurality of horizontal L-shaped slides 15. One leg of each L-shaped slide is secured against one wall of tubular sections 14 with the other leg projecting away from the tubular section. The slides are spaced at uniform, pre-selected intervals so as to receive with clearance, drawers 12 to be hereafter described. If it is desired, for example, to have the unit accommodate drawers of different thickness, then certain of the slides can be spaced as required, the spacing being dictated by the thickness of the drawer unit to be mounted therein. The securing of the slide to the tubular sections creates an extremely rigid side section. As stated, two such side sections 13 are required for each framework 11, with the left side section being reversed from the right side section so that the legs of the slides on each side section project toward one another. The projecting legs define shelves for receiving the drawers to be hereafter described while the legs secured to the tubular sections provide guides for the drawer sides.

A pair of channels 16 are provided for spacing of the side sections and securing same at the uppermost ends of the tubular sections. Channels 16 open downwardly and overfit with the upper ends of tubular sections 14, and may be secured thereto by any suitable means such as screws and nuts, 17. Channels 18, parallel to channels 16, are connected at opposite ends thereof to the lower ends of tubular sections 18. Channels 18 open downwardly and have the top thereof notched to receive tubular sections 14, with the sides of the channel overlying opposite sides of the tubular section so that the channels may be connected to the tubular sections, such as by means of screws and nuts 17.

For additional rigidity and to provide a stop for the drawers, rear cross braces 19 extend diagonally between opposite corners of the joints between tubular sections 14, a channel 16 and a channel 18. The end, provided with cross braces 19, thereby becomes the rear end, with the opposite end being the front end. A screw and nut 20 will preferably pass through and secure the two cross braces at the point of crossing.

In the knocked-down condition, framework 11 consists of two side sections 13, two channels 16, two channels 18, two cross braces 19 and a requisite number of screws and nuts. The entire unit thereby lays relatively flat for storage and shipping and can be quickly assembled into a free-standing, relatively rigid unit.

Drawers 12 are preferably fabricated of an inexpensive material, such as corrugated cardboard, so that the user may economically keep on hand a number of drawers far in excess of the number accommodated by the framework. A drawer 12 will be inserted in each of the oppositely disposed slide pairs, and the various materials will be stored in the various drawers. When the material relating to a particular project or subject is no longer required to be held for immediate access, the drawer or drawers in which the material is stored can be quickly removed and stored in a bulk storage area, thereby to make room for additional drawers for current projects. Additional drawer receiving frameworks may be provided at the storage area to receive the drawers.

A typical drawer construction may be as follows. A bottom panel 21 of corrugated cardboard material would have side sections 22 to form the side of the drawer and to define the clear height of the drawer interior. For strength and rigidity, each side section 22 is folded on itself, as best shown in FIG. 2, and a portion thereof overlies bottom panel 21 and is secured thereto by any suitable means. Securing may be accomplished by staples 23 or the contacting surfaces may be cemented to form a rigid connection. The front and rear ends 24 are similarly formed with portions thereof folded into overlying relationship with bottom panel 21 and secured by means of staples 25 or cement. The corners between sides 22 and ends 24 may be overlapped or bevelled, as desired.

A top panel 26 overlies bottom panel 21, with the spacing being determined by the height of side sections 22 and front and rear ends 24. The rear end 27 of top panel 26 is folded and depends in overlying relationship with rear end 24 and is secured thereto by suitable means such as staples 28 or cement. While staples are shown, cementing of the contact surfaces along the length thereof has been found preferable. With either construction, a rigid drawer unit results, due primarily to the five sided corner construction. A longitudinal score 31 is applied to top panel 26 to form a fold line for the top panel whereby the front portion of top panel 26 may be raised to provide access to the drawer interior. The score line between the top panel and rear end 27 permits the entire top panel to be raised for access to the entire drawer. A partially raised position is shown in phantom in FIG. 1.

Thus, in normal use, the drawer need be slid only part way out for access to the drawer interior by raising the forward portion of the top panel about score line 31. When the drawer is removed from the framework, the entire top panel may be raised.

The top panel may be provided with a front portion which is folded over front end 24 to provide dust protection. The wide contact surfaces of the underside of the top panel assure good dust protection, even without a front portion. Any suitable means may be provided for latching the top panel such as a tab 34 extending from the front portion and adapted to be secured by a latch 35 for latching the drawer in a closed position. If the top panel is not provided with a front portion, a strap with any suitable latching means will perform the hold-down function. Suitable handles 36 are also secured to the front face of front end 24 in order that drawer 12 may be grasped for sliding in the framework.

A plurality of drawers 12 are slid into framework 11 with the drawers being supported and guided by slides 15. Suitable indicia marked on the front face of each drawer identifies the material in the drawer and, for access to the material, a drawer is partially pulled out by means of handle 36 until score line 31 is outside of the framework. The drawer is supported by its respective slide 15. For access to material within the drawer, top panel is raised and bent about score line 31. Large drawings and other renderings may readily be placed in or removed from the drawer. When the material in the drawer is no longer required to be readily available, the cover is latched and the entire drawer may be removed and stored in a dead storage area until such time as the material is again needed. Drawers transferred to the dead storage area may be stored in a framework or stacked without a framework. Drawers storing material in constant use may be kept in the famework for as long as desired. New, empty drawers are substituted for those removed to the dead storage area.

The importance of this invention can not be overstressed. Especially in the field of graphic arts, large storage areas are required for the flat storage of renderings, displays, presentations, etc. While these materials are being worked on, they must be readily available. However, after several months, it quite often occurs that the materials need not be readily available since they may not be needed for several months or more. Of course, they can not be discarded. In such cases, the drawing rooms become overcrowded with permanent storage systems filled with materials which must be saved but need not be accessible. With the invention heretofore described, the materials may be stored in a flat position and may be held in the work area for so long as their presence is required. As soon as a project is terminated or suspended, the entire drawer may be removed and transferred to a dead storage area until it should again be required, to make room for storage drawers for materials created for new projects. By fabricating the drawer sections from corrugated cardboard or other suitable materials, storage drawers may economically be stored in dead storage areas for as long as desired and new drawers may be substituted for drawers, as they are removed.

The framework 11 can be provided with enclosing panels having finished exteriors in order to convert the storage unit into an attractive piece of furniture. Such an arrangement is best shown in FIGS. 4 and 5. A top finished panel 41 would overlie the top of framework 11 and would be secured thereto by means of suitable screws 42 passing through suitable apertures 43 in channels 16 (FIG. 1). A pair of finished side panels 44 would be secured to side sections 13 by means of screws 45 passing through suitable apertures in tubular sections 14. Each side panel 44 provides the sole support for a finished door panel 46 hinged to its respective side panel 44 by means of hinges 47. The doors may be provided with knobs 48 provided for holding the doors in the closed position. Of for opening the same, and any suitable type of latch would be provided for holding the doors in the closed position. Of course, if the rear of the framework is to be exposed, it could also be provided with a finished rear panel (not shown).

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A storage system comprising a substantially rigid framework of permanent construction, said framework including supporting and guiding means for slideably receiving a plurality of drawers in superposed relationship, and a plurality of completely closed and selectively partially and full openable drawers fabricated of a relatively inexpensive and less permanent material as compared with said framework, said drawers adapted for insertion in said framework to provide available storage and adapted for removal for dead storage.

2. A drawer for a storage unit comprising a bottom panel of relatively thin and foldable material having outwardly extending side sections and outwardly extending front and rear sections, each of said sections being folded to form an upstanding outer section, a spaced section parallel to said bottom panel, an upstanding inner section and a terminal section in overlying engagement with said bottom panel, means securing said terminal section to said bottom panel, a top panel in overlying contact with said spaced section and parallel to said bottom panel, said top panel having a rear end overlying the outer section of said rear section and secured thereto whereby to define the rear of said drawer and means for releasably securing said top panel in a closed position, said top panel being provided with a score intermediate and parallel to said front and rear sections, said top panel being bendable about said score.

3. The structure defined in claim 1 and further including finishing panels for at least partially enclosing said framework, said finishing panels including at least a top panel, a pair of side panels and a pair of doors, said top panels and said side panels being secured to said framework, and hinges connected between each one of said doors and a respective one of said side panels to form the sole support for said doors.

4. A drawer for a storage unit fabricated of relatively thin foldable material comprising bottom, side, front, rear, and top panels interconnected to form a closed container, said top panel being provided with an intermediate, longitudinal score dividing said top panel into front and rear portions, and a rearward longitudinal score defining a connecting portion, said connecting portion being secured in overlying relationship to said rear panel, said front portion being foldable about said intermediate score to permit said front portion to be raised for access to the interior of said closed container, said top panel being foldable about said rearward score to permit said top panel to be raised to fully open said closed container.

References Cited
UNITED STATES PATENTS

| | | | |
|---|---|---|---|
| 668,582 | 2/1901 | McClintock | 312—330 |
| 966,549 | 8/1910 | Hooker | 312—330 X |
| 1,474,687 | 11/1923 | Raby | 108—102 |
| 1,769,596 | 7/1930 | Neidich | 206—63 |
| 2,350,262 | 5/1944 | Van Rosen | 229—34 |
| 2,443,515 | 6/1948 | Rockwell | 312—324 |
| 2,603,405 | 7/1952 | Frankenstein | 229—34 |
| 2,870,951 | 1/1959 | Struble | 229—34 |
| 2,928,681 | 3/1960 | Wilson | 211—126 X |
| 2,959,298 | 11/1960 | Pope | 211—126 |
| 3,261,537 | 7/1966 | Kistner | 229—54 |

DAVID J. WILLIAMOWSKY, *Primary Examiner.*

JAMES T. McCALL, *Examiner.*